United States Patent Office 3,233,074
Patented Feb. 1, 1966

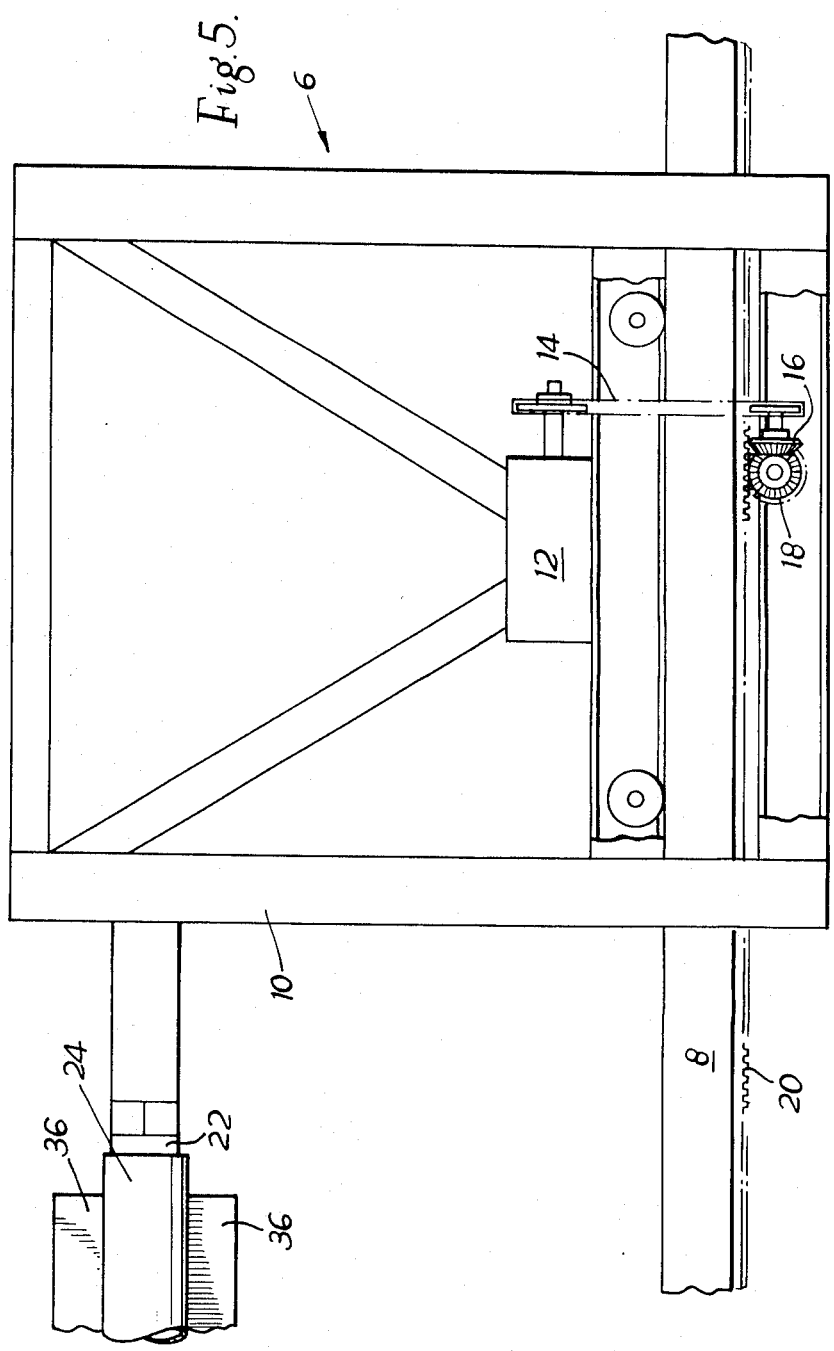

3,233,074
MACHINE FOR FORMING TUBES WITH
LONGITUDINALLY EXTENDING FINS
Allan Keppie Smith, Renfrew, Scotland, assignor to
Babcock & Wilcox, Limited, London, England, a company of Great Britain
Filed Sept. 19, 1962, Ser. No. 224,682
Claims priority, application Great Britain, Sept. 20, 1961, 33,740/61
7 Claims. (Cl. 219—124)

This invention relates to a method of and a machine for forming tubes with longitudinally extending fins. A difficulty which arises in forming a long tube with diametrically opposed longitudinally extending fins by uniting the tube and the fins by fusion welding is that of obtaining a completed product which is straight. This difficulty is due to thermally induced stresses, resulting from the welding of the fins to the tube, which tend to effect bowing of the tube and fins. An approximately straight finned tube may be produced by uniting the fins to the tube by forming first weld deposits at one side of the fins and then forming second weld deposits at the other side of the fins but during the formation of the second weld deposits the tube and fins must be straightened and rectifying the bowing caused during the deposition of the first weld deposits presents difficulties.

The present invention includes a method of forming a tube with longitudinally extending fins which includes assembling the tube and two metal strips with the strips diametrically opposed and with the edges thereof parallel to the tube axis, locating adjacent fusion welding elements at opposite sides of a plane containing the axis of the tube and passing through radially inner edges of the strips and in position to weld respective strips to the tube and simultaneously fusion welding the strips to the tube.

The invention also includes a machine adapted to form tubes with longitudinally extending fins having positioning means for positioning edges of metal strips parallel to the axis of a tube and at diametrically opposite locations in readiness for a welding operation, adjacent electric fusion welding heads adapted simultaneously to effect at opposite sides of a plane containing the axis of the tube and passing through the radially inner edges of the strips fusion welds between the strips and the tube and motive means for effecting relative movement in the direction of the length of the tube between the tube and strips and the welding heads.

The invention will now be described, by way of example, with reference to the accompanying, partly diagrammatic, drawings, in which:

FIGURE 4 is a sectional elevation taken on the line IV—IV of FIGURE 1; and

FIGURE 5 is a partly sectioned elevation of a motive means.

Figure 1:
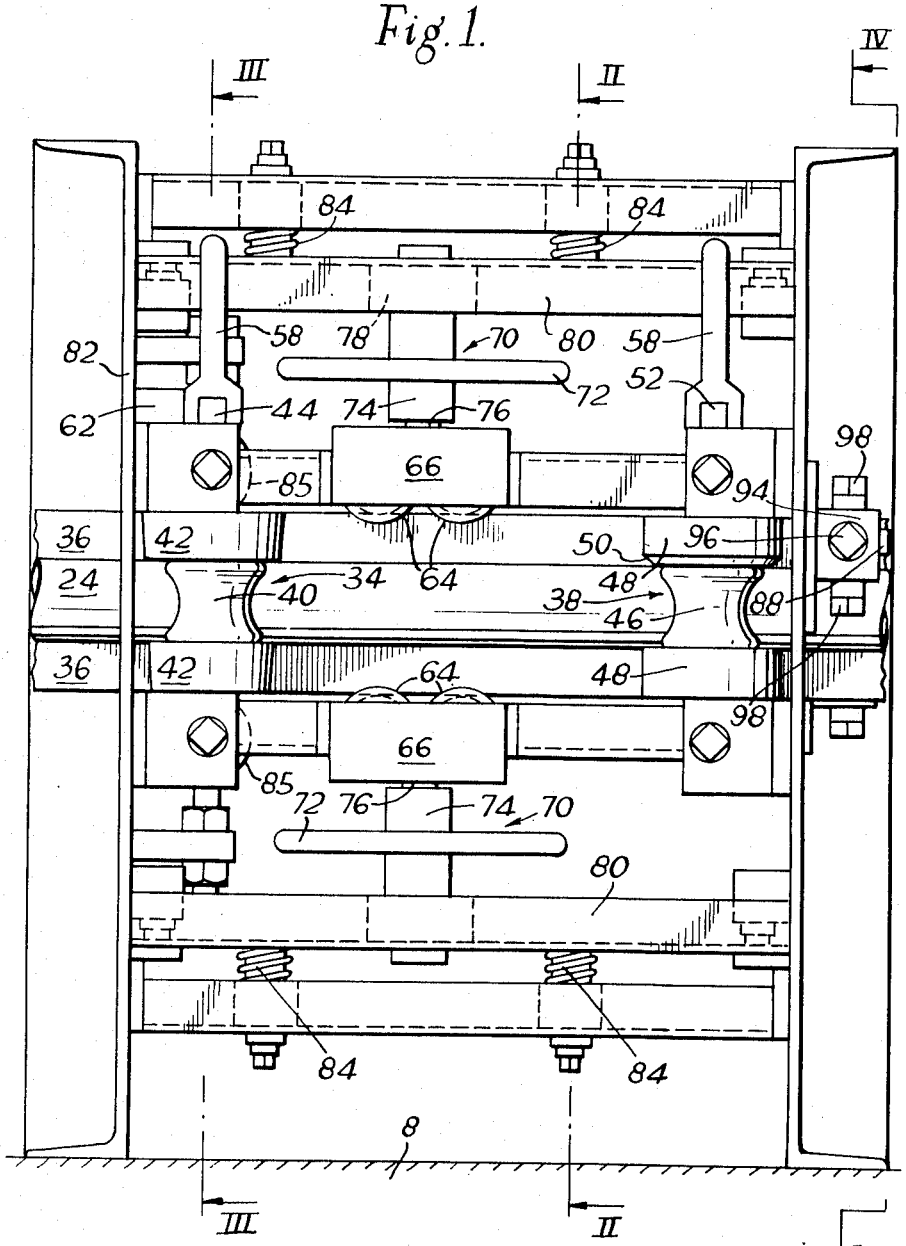
FIGURE 1 is a sectional elevation of positioning means of a welding machine, taken on the line I—I of FIGURE 2 omitting welding heads for the sake of clarity.
Figure 2:
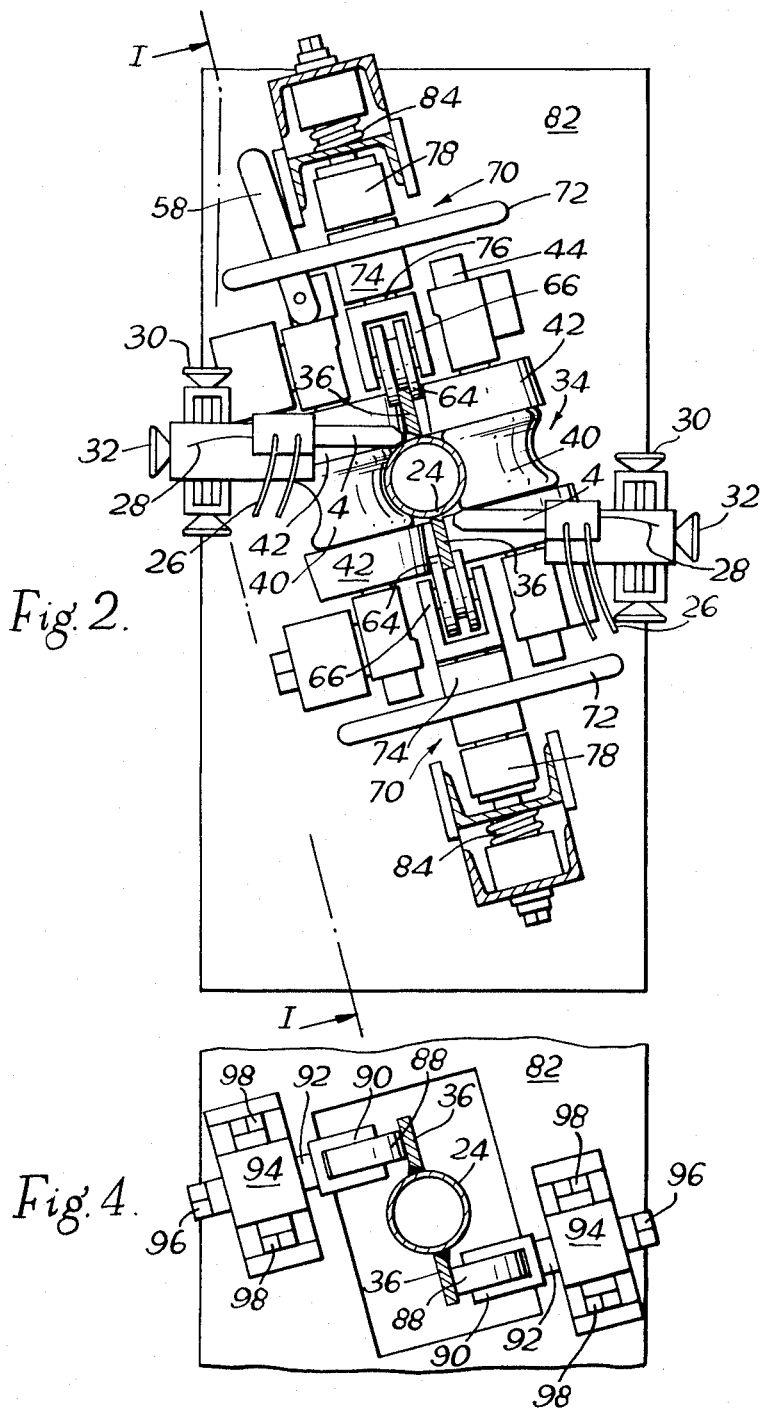
FIGURE 2 is a sectional elevation taken on the line II—II of FIGURE 1 indicating welding heads.
Figure 3:
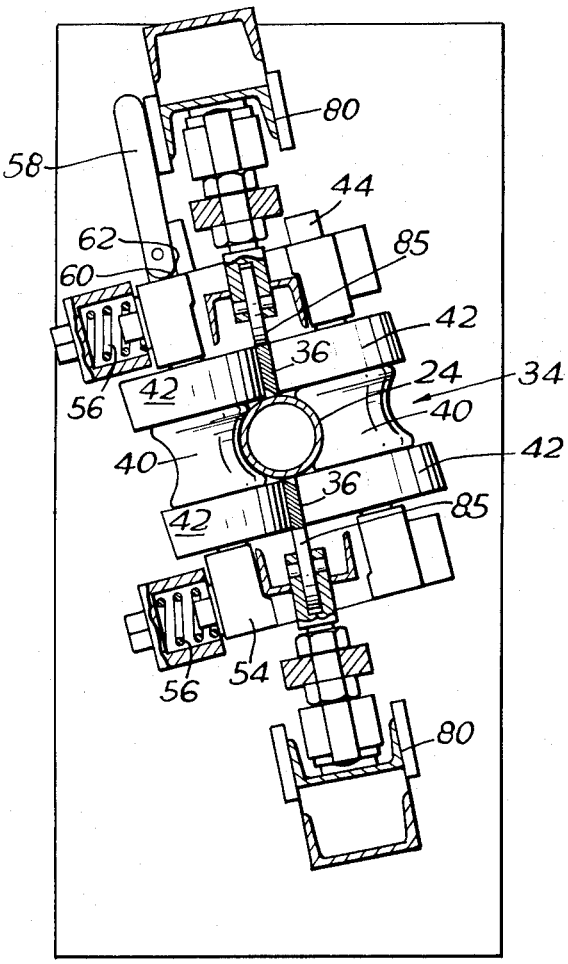
FIGURE 3 is a sectional elevation taken on the line III—III of FIGURE 1.

The positioning means 2, the welding heads 4 and the motive means 6 are mounted on a bed plate 8. The motive means 6 comprises a carriage 10 arranged to be driven along the bed plate 8 at adjustable speed by means of a reversible electric motor 12 driving, through a chain drive 14 and bevel gearing 16, a pinion 18 meshing with a rack gear 20 located on the bed plate undersurface. A mandrel chuck 22 enables the carriage 10 rapidly to be clamped to or released from a tube, as indicated at 24.

Each welding head 4 forms part of an automatic unit (shown diagrammatically) arranged to operate with shielding of the arc by carbon dioxide supplied through a tube 26, with feeding of welding wire 28 to a weld groove and with automatic control of the welding voltage and current.

The welding heads 4 are each mounted for vertical and lateral movement relative to the tube by means of screw adjusters 30, 32.

The positioning means 2 includes two sets 34 of rollers in advance of the welding heads 4 in the direction of the relative movement and disposed at opposite sides of the tube 24 and strips 36 and two sets 38 of rollers following the welding heads 4 in the direction of the relative movement and disposed at opposite sides of the tube 24 and strips 36 to effect relative lateral positioning of the tube 24 and the strips 36. Each set 34 of rollers comprises a central roller 40 with a concave periphery conforming with the curvature of the outer surface of the tube 24 flanked by rollers 42 with frusto-conical peripheries for engaging sides of the respective strips 36 and the rollers of each set are rotatably mounted on a common spindle 44.

Each set 38 of rollers comprises a central roller 46 with a concave periphery conforming with the curvature of the outer surface of the tube flanked by rollers 48 with flat peripheries for engaging sides of the respective strips 36 the upper roller of one set and the lower roller of the second set having a frusto-conical end portion 50 and the rollers of each set are rotatably mounted on a common spindle 52.

Both in the set 34 of rollers in advance and in the set 38 of rollers following the welding heads the spindle 44, 52 of one of the sets is mounted in bearings 54 movable in a slide-way, each bearing being biassed by a spring 56 to urge the set of rollers towards the tube 24 and the strips 36. A lever 58 pivotally mounted on one of the spindles 44, 52 of each pair of sets 34, 38 is formed with a cam surface 60 arranged to abut a face 62 of the fixed structure so that movement of the lever 58 from the position shown moves the respective spindle against the action of the springs 56 to relieve the pressure exerted between the rollers of the respective sets 34, 38 on the tube 24 and strips 36. Two rollers 64 spaced a small distance apart in the direction of the axis of the tube 24 and rotatably mounted in the neighbourhood of the welding heads 4 in a frame 66 slidable in a slide-way 68 and associated with a captive device 70 including an operating wheel 72 and nut and screw means 74, 76 whereby the rollers 64 may be moved towards or away from the axis of the tube, apply pressure to force the strips against the tube. Each captive device 70 is mounted in a ball bearing 78 on a cross piece 80 slidable in a main frame 82 carrying the sets 34, 38 of rollers, biassing springs 84 urging the respective cross piece 80 towards the tube 24.

The axes of the sets 34, 38 of rollers are similarly inclined from the vertical at an angle of 15° and towards the two welding heads 4 one of which is arranged to direct wire 28 towards the junction of the tube 24 and an upper strip 36 and the other of which, at the other side of the tube, is arranged to direct electrode wire 28 towards the junction of the tube 24 and the lower strip 36.

The frusto-conical faces of the pairs of rollers 42 of the sets 34 in advance of the welding heads 4 give an inclination of 3½ degrees to the strips 36 at the said rollers 42 in relation to a plane containing the axis of the tube 24 and the radially inner edges, or roots, of the strips 36 from their roots to their tips in directions away from the welding heads 4 to compensate for shrinkage of the weld metal on cooling and give in the completed finned tube substantially radial orientation of the strips. Auxiliary pressure rollers 85 bearing on the radially outer edges of the strips 36 tend to prevent lifting of the strips 36 during the welding operation.

Each strip 36 is constituted by a flat one edge of which is bevelled at an angle of 30°, to leave, for example, in a flat having a thickness of 3/8 inch, a surface having a width of 1/16 inch for engagement with the outer surface of the tube 24 when the strip is positioned substantially radially to the tube to form a welding groove 86 between the surface of the tube and the opposed bevelled surface of the flat.

The frusto-conical faces 50 formed on one of the rollers 48 of each set 38 are arranged to co-incide with a weld deposit deposited in the grooves 86.

A pair of final guide rollers 88 are mounted on the framework 82 with the rollers 88 on the same side of a strip 36 as the respective welding head 4 and bearing against the strip. Each roller 88 is mounted in a bracket 90 having a squared shank 92 which is a sliding fit in the vertical sides of a housing 94. A threaded stud 96 bearing on the end of the squared shank 92 is adjustable to alter the force exerted by the roller 88 on the strip 36 and threaded studs 98 bearing on the sides of the squared shank 92 not engaging with the housing 94 are adjustable to alter the position of the roller 88 radially of the tube 24.

In operation a tube 24 which is to be finned is placed in position in relation to the sets 34, 38 of rollers and the carriage 10 is brought into position in relation to an end of the tube and is secured to the tube by operation of the mandrel chuck 22 and the upper rollers 64 are raised and the lower rollers 64 are lowered by means of the hand wheels 72. Two strips 36 are then inserted in position in relation to the tube 24 and the sets 34, 38 of rollers, the rollers 64 are tightened against the flats by operation of the hand wheels 72 and the strips 36 are tack welded to the tube 24 in order to ensure that they cannot slip longitudinally relatively to the tube before they are secured thereto by the main welding operation. Finally the carriage 10 is adjusted in position to ensure that the welding heads 4 are adjacent to the starting ends of the strips 36 and welding is begun.

During the welding operation the rollers 64 exert the pressure necessary to hold the strips 36 against the tube 24 and counter the tendency for parts of the strips to move away from the tube as they approach the welding position. The springs 56 associated with the sets 34, 38 of rollers and the springs 84 associated with the rollers 64 serve to accommodate variations in the dimensions of the strips 36.

Since the welding is effected in a symmetrical manner simultaneously at diametrically opposite points of the tube 24 and at locations on opposite sides of the plane containing the longitudinal axis of the tube and passing through the roots of the strips, bending of the tube and fins as a result of the welding operation is avoided or minimized. The final rollers 88 are adjusted to correct any deviation of the strips 36 from the diametrical plane after the welding operation.

In one typical set of welding conditions the carriage 10 was driven at a rate of two feet per minute and welding was carried out by means of welding wire having a diameter of 1.2 mm. at an arc voltage of between 28 and 30 volts and current of 260 amperes the carbon dioxide gas flow per head being 40 cubic feet per hour.

In a modified form of machine, not shown, instead of two there are four welding heads, two arranged to direct electrodes laterally towards the junction of the tube and one strip from opposite sides thereof and two arranged to direct electrodes laterally towards the junction of the tube and the other strip from opposite sides thereof. In such case the axes of rotation of the rollers of the sets 34, 38 and of the roller means 64 are upright, and the roots of the strips are formed with bevels on each side to provide two welding grooves, for each strip.

What is claimed is:
1. A machine adapted to form tubes with longitudinally extending fins having positioning means for positioning edges of metal strips parallel to the axis of a tube and at diametrically opposite locations in readiness for a welding operation; electric fusion welding means adapted simultaneously to effect at opposite sides of a plane containing the axis of the tube and passing through the radially inner edges of the strips fusion welds between the strips and the tube, said last named means including two welding heads, one welding head at one side of the said plane and arranged to direct an electrode towards the junction of the tube and one strip and the other welding head at the other side of the plane and arranged to direct an electrode towards the junction of the tube and the other strip; two sets of rollers in advance of the welding heads disposed at opposite sides of the tube and strips and adapted to effect relative lateral positioning of the tube and strips, pairs of rollers of the sets being formed with frusto-conical surfaces adapted to give a small inclination of the central longitudinal plane of the corresponding strip in relation to said first named plane in a direction away from the corresponding welding head; and motive means for effecting relative movement in the direction of the length of the tube between the tube and strips and the welding heads.

2. A machine as claimed in claim 1, wherein two sets of rollers following the welding heads in the direction of the relative movement and disposed at opposite sides of the tube and strips cooperate with the two sets of rollers in advance of the welding heads to effect relative lateral positioning of the tube and the strips.

3. A machine as claimed in claim 2, wherein in both the sets of rollers in advance and in the sets of rollers following the welding heads one of the sets is provided with resilient means for urging the set towards the other set.

4. A machine as claimed in claim 1, wherein roller means are provided in the neighborhood of the welding heads for forcing the strips against the tube.

5. A machine as claimed in claim 4, wherein the roller means are provided with resilient means for urging the roller means towards the tube.

6. A machine as claimed in claim 5, wherein two final rollers positioned on opposite sides of the tube after the sets of rollers following the welding heads bear against the side of the respective strip to which the welding head is disposed.

7. A machine as claimed in claim 1, wherein each welding head is arranged to operate with a consumable electrode and with gas shielding of the arc.

References Cited by the Examiner
UNITED STATES PATENTS

| | | | |
|---|---|---|---|
| 1,797,795 | 3/1931 | Ruhr | 219—124 X |
| 1,831,343 | 11/1931 | Caldwell | 219—137 X |
| 2,132,975 | 10/1938 | Shaver | 219—124 |
| 2,632,081 | 3/1953 | Evans | 219—124 |
| 2,667,559 | 1/1954 | Arnold | 219—137 |
| 2,680,182 | 6/1954 | Chambers | 219—124 |
| 2,827,551 | 3/1958 | Orr et al. | 219—137 |

RICHARD M. WOOD, *Primary Examiner.*

JOSEPH V. TRUHE, *Examiner.*